United States Patent
Dorobantu et al.

(10) Patent No.: US 9,502,062 B1
(45) Date of Patent: Nov. 22, 2016

(54) USING TWO OR MORE OFFSET REPEATABLE RUNOUT CORRECTION VALUES FOR A VIRTUAL TRACK OF A MAGNETIC DISK

(71) Applicant: Seagate Technology LLC, Cupertino, CA (US)

(72) Inventors: Andrei Dorobantu, Minneapolis, MN (US); Thomas C. Zirps, Minneapolis, MN (US); Tim Rausch, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/928,668

(22) Filed: Oct. 30, 2015

(51) Int. Cl.
*G11B 5/596* (2006.01)
*G11B 5/00* (2006.01)

(52) U.S. Cl.
CPC ... *G11B 5/59627* (2013.01); *G11B 2005/0021* (2013.01)

(58) Field of Classification Search
CPC . G11B 5/59627; G11B 5/5534; G11B 5/012; G11B 5/596
USPC .............................. 360/77.04, 77.08, 77.06
See application file for complete search history.

(56) References Cited

U.S. PATENT DOCUMENTS

| | | | | |
|---|---|---|---|---|
| 7,457,075 B2 * | 11/2008 | Liu | ............ | G11B 5/59605 360/77.04 |
| 7,583,470 B1 * | 9/2009 | Chen | ............ | G11B 5/59627 360/77.04 |
| 8,693,134 B1 | 4/2014 | Xi et al. | | |
| 2001/0036033 A1 * | 11/2001 | Baumann | ............ | G11B 5/59605 360/77.08 |
| 2001/0048570 A1 * | 12/2001 | AbouJaoude | ...... | G11B 5/59616 360/77.04 |
| 2002/0109933 A1 | 8/2002 | Ashikaga et al. | | |
| 2009/0244759 A1 * | 10/2009 | Mori | ............ | G11B 5/59627 360/47 |

* cited by examiner

*Primary Examiner* — Nabil Hindi
(74) *Attorney, Agent, or Firm* — Hollingsworth Davis, LLC

(57) ABSTRACT

First and second repeatable runout (ZAP) values are both located on a first virtual track of a magnetic disk. The first ZAP value is offset from the first virtual track center in a first direction and the second ZAP value is offset from the first virtual track center in a second direction opposite the first direction. At least one of the first and second ZAP values are accessed when performing repeatable runout correction for a writer of the read/write head that is being positioned over a second virtual track of the magnetic disk.

20 Claims, 5 Drawing Sheets

USING TWO OR MORE OFFSET REPEATABLE RUNOUT CORRECTION VALUES FOR A VIRTUAL TRACK OF A MAGNETIC DISK

SUMMARY

The present disclosure is directed to using two or more repeatable runout correction values for a virtual track of a magnetic disk. In one embodiment, first and second repeatable runout correction (ZAP) values are computed and written to a magnetic disk along a first virtual track. The first ZAP value is computed and written to the disk at an offset from the first virtual track center in a first direction. The second ZAP value is computed and written to the disk at an offset from the first virtual track center in a second direction opposite the first direction. At least one of the first and second ZAP values are accessed by the servo system performing tracking and repeatable runout correction along the first virtual track concurrent to the writer transducer performing a write operation while positioned over a second virtual track.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates to compensating for repeatable runout in hard drives where the recording head read/write offset changes dynamically over time. In particular, this is applicable to the repeatable runout seen in data storage devices that utilize heat-assisted magnetic recording (HAMR), also referred to as energy-assisted magnetic recording (EAMR), thermally-assisted magnetic recording (TAMR), and thermally-assisted recording (TAR). In these devices, read/write offset changes are frequently more dramatic and less predictable than in conventional hard drives, and thus compensating for the effect is more important to ensure reliability.

Heat-assisted magnetic recording technology uses an energy source such as a laser to create a hotspot on a magnetic disk during recording. The application of heat lowers magnetic coercivity at the hotspot, allowing a write transducer to change the magnetic orientation on the media, after which the hotspot is allowed to rapidly cool. Due to the relatively high coercivity of the medium after cooling, the data is less susceptible to errors due to thermally-induced, random fluctuation of magnetic orientation, which is known as the paramagnetic effect. This allows data to be reliably written to a smaller area on a HAMR medium than would be possible using a recording medium with lower coercivity.

Figure 1:
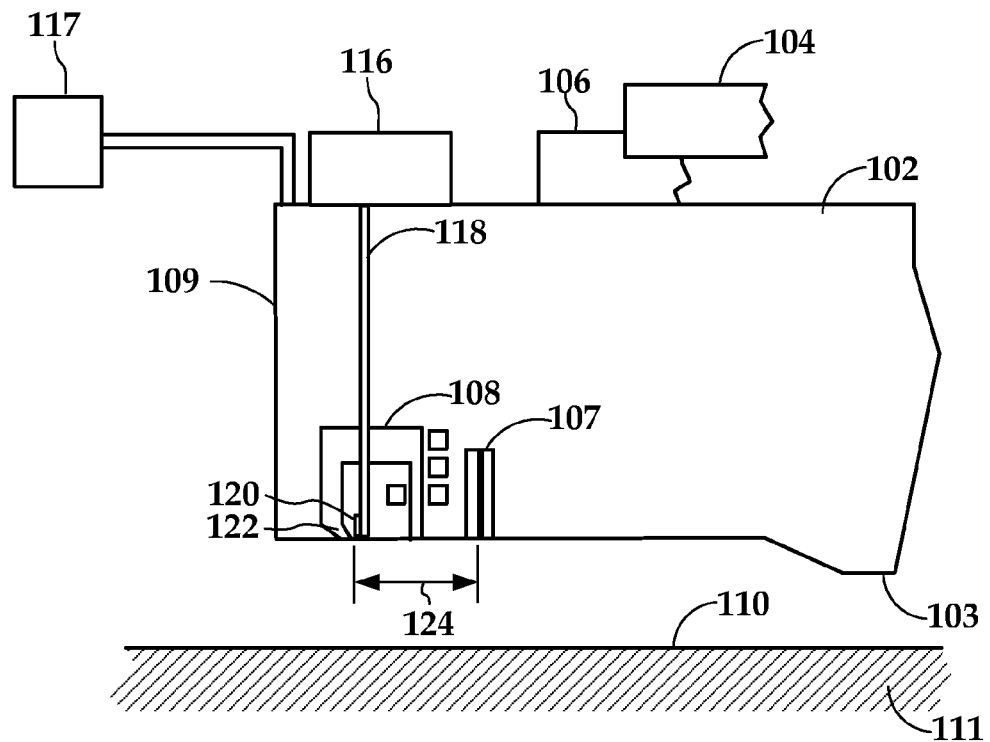
FIG. 1 is a block diagram of a read/write head according to an example embodiment.

In reference now to FIG. 1, a block diagram shows a side view of a hard drive slider 102 used in a HAMR data storage apparatus according to an example embodiment. The slider 102 is coupled to an arm 104 by way of a suspension including a gimbal assembly 106 that allows some relative motion between the slider 102 and arm 104. The slider 102 includes one or more read transducers 107 and one or more write transducers 108 at a trailing edge 109 that are held proximate to a surface 110 of a magnetic recording medium, e.g., magnetic disk 111. When the slider 102 is located over surface 110 of the disk 111, a passive flying height is maintained between the slider 102 and the surface 110 by a downward force of arm 104. This downward force is counterbalanced by an air cushion that exists between the media surface 110 and an air bearing surface 103 of the slider 102 when the disk 111 is rotating.

A controller 117 is coupled to the read/write transducers 108, as well as other components of the read/write head 102, such as heaters, sensors, etc. The controller 117 may be part of general- or special-purpose logic circuitry that controls the functions of the HAMR apparatus. The controller 117 may include or be coupled to interface circuitry such as preamplifiers, buffers, filters, digital-to-analog converters, analog-to-digital converters, decoders, encoders, etc., that facilitate electrically coupling the logic of the controller 117 to the signals used by the read/write head 102 and other components.

The illustrated read/write head 102 is configured as a HAMR apparatus, and thus includes additional components that form a hotspot on the recording medium 111 near the write transducer 108. These components include a laser 116 (or other energy source) and waveguide 118. The waveguide 118 delivers light from the laser 116 to components near the write transducer 108, such as a near-field transducer (NFT) 120 that is proximate the tip of a write pole 122.

The read transducer 107 is separated from the write transducer 108 by a downtrack separation distance 124. For example, this distance 124 may be measured approximately between the NFT 120 and a center of the read transducer 107. This physical separation is often called the read/write offset because it can cause the reader and the writer to fly over different tracks, depending on the skew angle.

Figure 2:
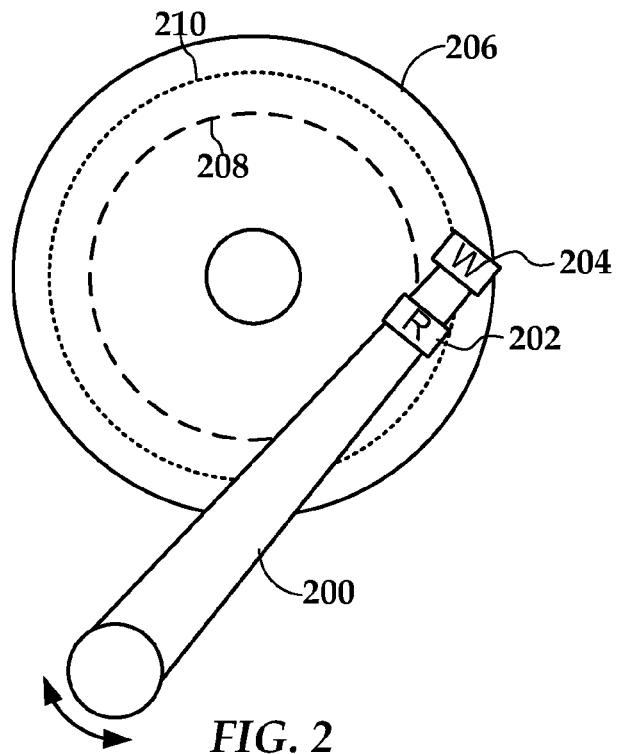
FIG. 2. is a block diagram of a hard disk device according to an example embodiment illustrating the effects of skew and reader/writer separation.

In reference now to FIG. 2, a schematic diagram of a hard disk device illustrates the effect reader and writer separation can have on tracking. Shown in this figure are an actuator arm 200 with a reader 202 and a writer 204 mounted on a distal end. The arm moves over the surface of a disk 206 upon which tracks of data are recorded. The scale/proportions of the drawing are exaggerated to show the effects of skew angle and read/write offset can have on positioning of the read and write transducers 202, 204 over the disk 206.

Due to actuator skew angles and a physical separation between reader and writer elements on the recording head, the reader 202 and the writer 204 can fly over different radial positions on the magnetic media, as indicated by tracks 208, 210, respectively. For example, in order to write the outer track 210, the geometry of the actuator dictates that the reader fly over the inner track 208. The servo system uses the reader 202 with servo patterns from the inner track 208 to position the writer 204 correctly over the outer track 210.

Environmental conditions can dynamically affect the mechanical properties of the hard drive servo system. For example, changes in read/write offset as a function of ambient temperature have been identified in conventional hard drives. In such cases, thermal expansion of the recording head physically distorts the material and results in a change in the distance between the reader and the writer elements. Changing of reader/writer offset, if not compensated for, can significantly degrade tracking performance and have a negative impact on reliability.

A more extreme case of dynamically changing reader/writer offset has been identified in HAMR devices. It is presently believed that the HAMR recording head can, over time, experience a change in the laser focal point, or location of the hotspot described previously, relative to the reader position. The laser focal point on a HAMR recording head determines where the user data is written on the media. Hence, changes in laser focal point on HAMR drives can be equivalent to changes in the reader/writer offset on conventional drives. It is more accurate to refer to this phenomenon as dynamically changing read/write offset instead of reader/writer offset, since the main driver to the offset change on HAMR drives can actually be caused by a change in the laser and/or other optical delivery components in the read/write head. As will be shown below, dynamic read/write offset can negatively impact ZAP runout compensation.

A HAMR device uses read and write transducers that, except for the above noted laser and light-path components, may be similar to those used in conventional magnetic recording devices (e.g. perpendicular recording devices). In conventional recording devices, an effect known as repeatable runout (RRO) is caused by imperfections introduced during manufacture of the device. One type to RRO is written-in RRO, or WIRRO, which is caused by imperfections in the servo marks on the media. Generally, tracks on the magnetic disk are defined by creating servo marks that are then used for tracking control. The servo marks can either be written to the media prior to drive assembly, often by a multiple disk writer (MDW), or by the assembled hard drive using a technique called self-servo write (SSW). In either case, the read/write head responsible for writing the servo marks to the media experiences imperfections in its physical position over the media during the writing process. These imperfections in read/write head physical position translate directly into imperfections in the physical locations of the servo marks on the media. Subsequently, when the servo control system attempts to track a specific radial position based on the servo marks, the imperfections in the servo marks manifest as WIRRO. If uncorrected, WIRRO can cause significant reduction in reliability because neighboring tracks may inadvertently cause erasure and/or loss of data.

One solution to compensate for WIRRO is to define virtual tracks that are precisely aligned with the center of disk rotation. The use of virtual tracks in this manner is sometimes referred to as zero-acceleration path (ZAP) compensation, meaning that the servo system attempts to track an ideal circular path. Instead of tracking the as-written and imperfectly positioned servo marks, the ZAP servo system uses virtual tracks that are defined by compensating for WIRRO, resulting in minimal radial fluctuations. This can be accomplished via servo control algorithms that define the virtual tracks and cause the read/write head to align to the virtual tracks.

The purpose of the ZAP system is to eliminate the positioning errors caused by WIRRO. After assembly of the drive, a factory calibration process measures WIRRO at every servo pattern, on every track, and computes a corresponding ZAP compensation value. The ZAP data is used by the servo system as an equal and opposite "disturbance" to cancel the WIRRO disturbance. As a result, the reader follows a (more ideal) virtual track, instead of a (less ideal) physical track based on the actual servo marks written on the media. Due to the large memory requirement for ZAP data, the compensation values are written to the media along the virtual track.

Figure 3:
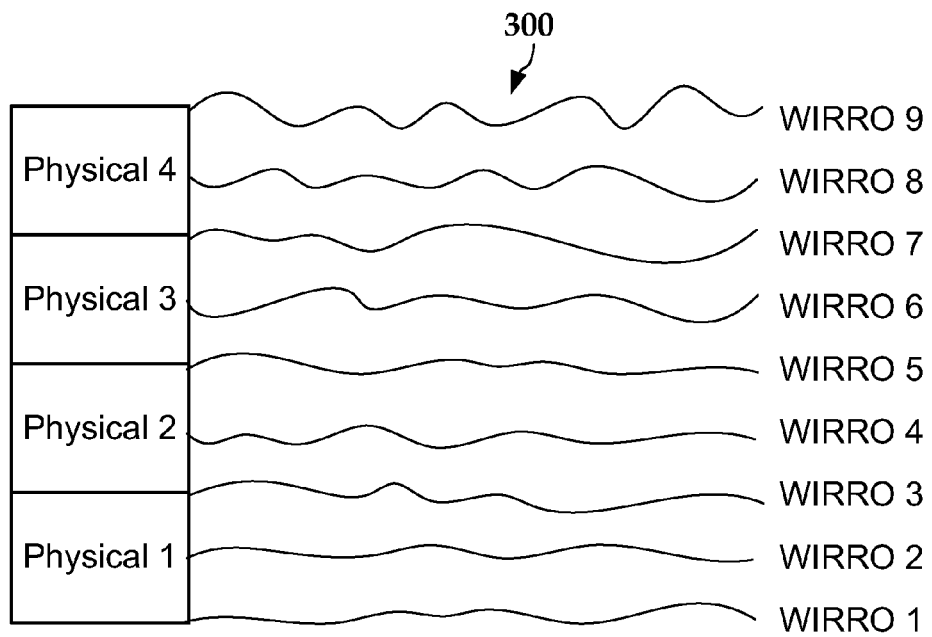
FIG. 3 is a block diagram illustrating an example of repeatable runout on a recording medium according to an example embodiment.

In FIG. 3, a block diagram illustrates an example of WIRRO on a recording medium according to an example embodiment. Four physical tracks 1-4 are shown, each defined by servo data written in corresponding passes 1-8, e.g., via a MDW or SSW. Because the servo writing process makes two passes per physical track in this example, the WIRRO signature on the media (shown as the wavy lines) 300 changes at every half physical track. Generally, the ZAP correction for the WIRRO will be computed at the virtual track center, as described below.

Figure 4:
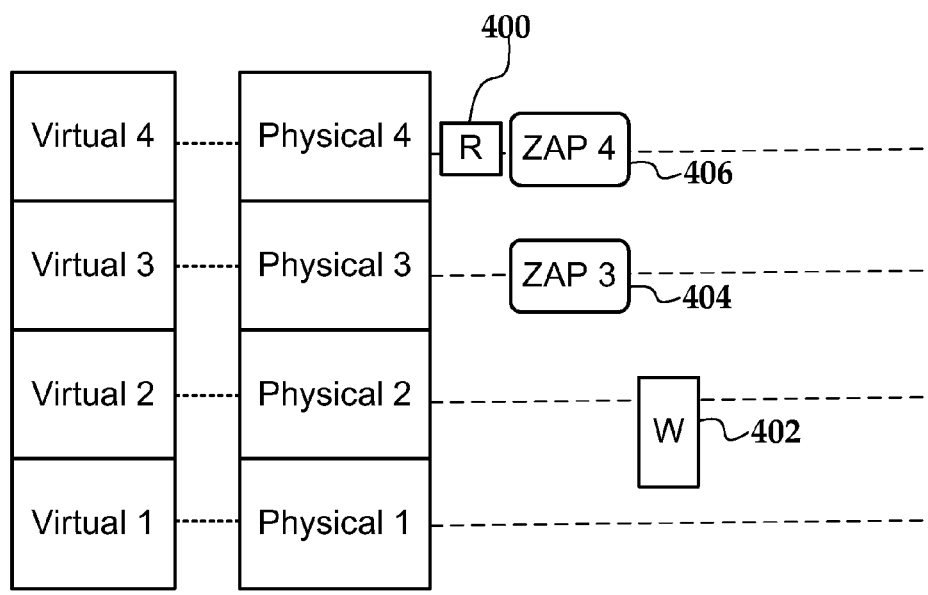
FIGS. 4-6 are block diagrams illustrating repeatable runout compensation according to example embodiments.

In FIG. 4, a block diagram illustrates how the ZAP system operates in a storage device according to an example embodiment. The physical tracks 1-4 shown in FIG. 3 are here mapped to virtual tracks 1-4. A reader 400 and the writer 402 are shown aligned over different tracks due to skew and the downtrack separation between the reader 400 and the writer 402. Also shown is ZAP data 404, and 406 associated with virtual tracks 3 and 4, respectively. The ZAP data 404, 406 may be written adjacent to (e.g., appended to) servo marks that define the physical tracks, and may be written as part of a factory calibration process that is performed after the drive is assembled.

In this example, due to the read/write offset, the reader 400 is following virtual track 4 as the writer 402 is positioned along another virtual track located between virtual tracks 1 and 2. As such, the ZAP value 406 is the write ZAP value containing the WIRRO compensation data necessary for the reader 400 to follow virtual track 4 while the writer 402 is positioned at a constant offset and performs a write operation. The virtual track defined by the writer position may also contain read ZAP data (not shown) that the reader 400 would use when reading data on that track.

Dynamically changing read/write offset presents a number of challenges with respect to the integrity of the recording system. This disclosure relates to methods and apparatuses that resolve the servo tracking problem under this condition. The proposed methods and apparatuses are predicated on full knowledge of the instantaneous read/write offset of the recording head. In other words, the drive system at large must measure the read/write offset, and compensate accordingly via the servo system to ensure reliable recording and reading of data. What follows is a description of an example embodiment that ensures the ZAP system remains effective in this condition.

In the ideal case, where the drive system is aware of its instantaneous read/write offset, ensuring that data is written reliably (e.g., always on the outer track 210 in FIG. 2) involves adjusting an offset to the reader position (e.g., shifting the inner track 208). Adjusting the reader position dynamically over time presents a problem for the ZAP system. The ZAP system provides effective compensation when the WIRRO experienced by the reader 400 matches the ZAP data computed and written to the media. Due to WIRRO changing at every half-track, the effectiveness of ZAP is sensitive and diminishes when the reader is offset from the virtual track center.

Figure 7:
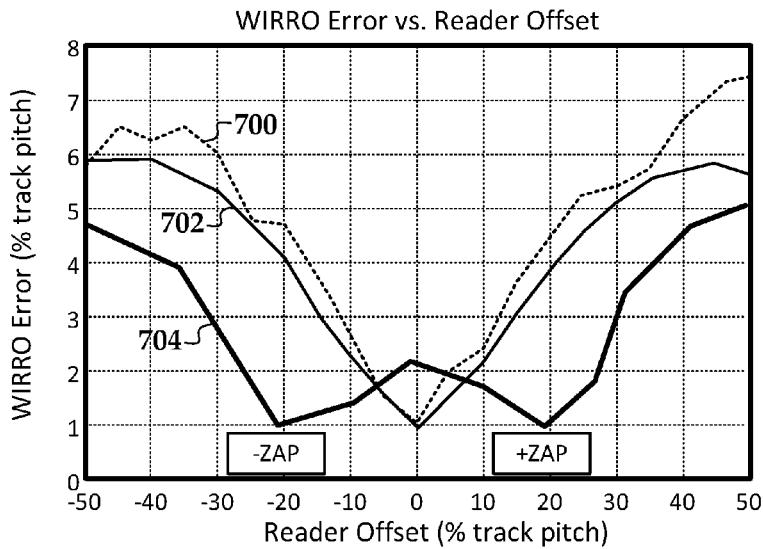
FIG. 7 is a graph showing how runout compensation changes as a function of reader offset according to an example embodiment.

In reference to FIG. 7, a graph shows how WIRRO error changes as a function of reader offset for a particular track according to an example embodiment. Curve 700 of FIG. 7 indicates maximum WIRRO errors for a track using a single ZAP field and curve 702 indicates three-sigma values for the same track. The data in FIG. 7 shows that at 30% reader offset or more, ZAP effectiveness is reduced and could possibly make tracking worse for the servo system.

Figure 5:
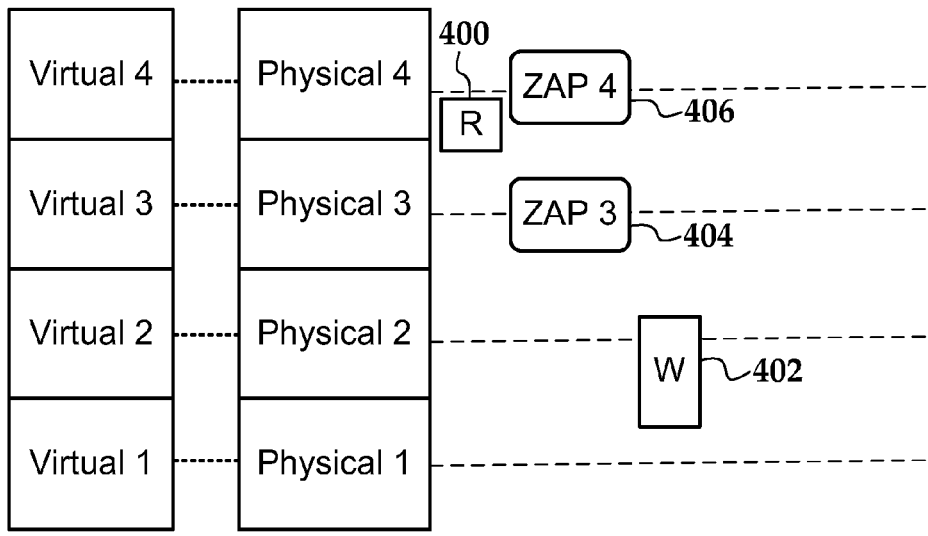

The loss of ZAP effectiveness due to reader offset causes problems for drives where the read/write offset changes dynamically over time. In order to guarantee recording system integrity, data should be written at a consistent radial position on the media. To ensure this, the reader position must be shifted by the change in read/write offset in order to maintain the writer position. For example, in the block diagram of FIG. 5, the diagram of FIG. 4 is reproduced, with the reader 400 shown in a shifted position while the writer 402 is shown in an unshifted position. Here, the WIRRO signature on the media at the shifted reader position no longer matches the compensation data in ZAP 4, which diminishes the effectiveness of ZAP.

Figure 6:
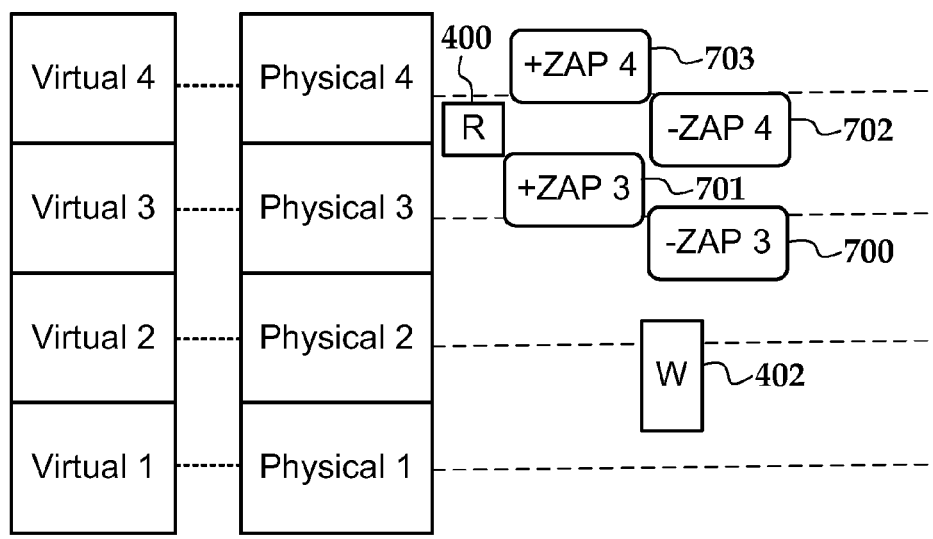

Embodiments described herein include features that allow the read/write offset of the recording head to change dynamically over time while still providing effective WIRRO compensation using ZAP. To accomplish this, two sets of ZAP data (for each virtual track) can be computed and written to the media. The two ZAP fields are computed and positioned to straddle the virtual track center, e.g., a first ZAP field being offset from the track center in a first direction and a second ZAP field offset from the track center in a second direction opposite the first direction. In FIG. 6, the arrangement of FIG. 4 is shown with two ZAP fields 700, 701 for the virtual track 3 and two ZAP fields 702, 703 for virtual track 4. In this example, the reader 400 is not centered on the virtual track 4 (due to a change in read/write offset), but rather is aligned with the -ZAP 4 field 702. As such, the ZAP fields 702, 703 are write ZAP fields that contain WIRRO correction data needed for the reader to follow the offset virtual track 4. Similarly, ZAP fields 700, 701 are write ZAP fields that contain WIRRO correction data for the reader to follow the offset virtual track 3. This architecture provides effective compensation for WIRRO even when the reader offset changes significantly. It will be understood that more than two ZAP fields may be used per virtual track. Generally, multiple offset read ZAP fields per virtual track will not be needed, because tracking of the reader is not affected by changes in reader-to-writer offset.

In FIG. 7, curve 704 in the graph shows the expected "widening" of the track offset region for which ZAP compensation is effective. The double ZAP architecture as shown in FIG. 6 allows the read/write offset to change by up to 20% without having an adverse effect on the tracking capability of the servo system. It will be understood that a data storage device may use a hybrid architecture that combines the single ZAP per track shown in FIGS. 4-5 with the dual ZAP per track as shown in FIG. 6. For example, because the changes in dynamic reader-to-writer spacing impact high-skew regions the most, regions with low skew may be able to use a single ZAP per track, thereby saving storage space in those regions. In other variations, different radial zones may use different numbers of ZAP fields per virtual track, e.g., one zone using three ZAP fields per virtual track, another zone using two ZAP fields per virtual track, another zone using one ZAP field per virtual track, etc.

Figure 8:
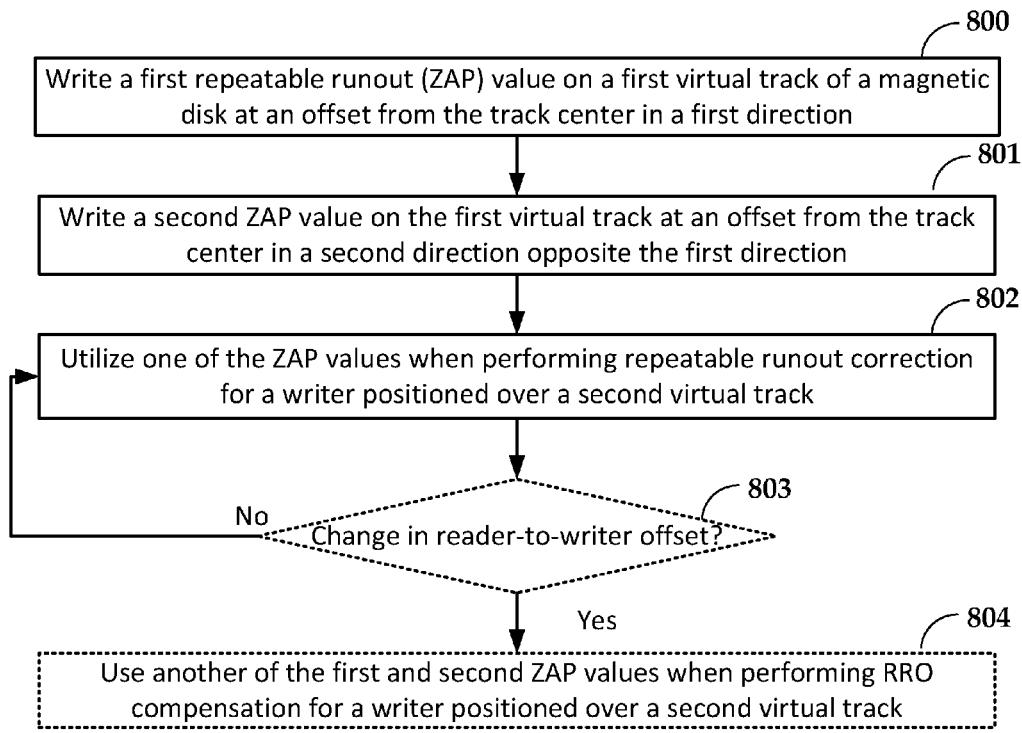
FIG. 8 is a flowchart of a method according to an example embodiment.

In FIG. 8, a flowchart illustrates a method according to an example embodiment. The method involves writing 800 a first repeatable runout (ZAP) value on a first virtual track of a magnetic disk. The first ZAP value is offset from the first virtual track center in a first direction. A second ZAP value is written 801 on the first virtual track offset from the track center in a second direction opposite the first direction. At least one of the first and second ZAP values are utilized by the servo tracking system 802 when performing repeatable runout correction for a writer positioned over a second virtual track of the magnetic disk. For example, both ZAP values may be read (if possible) and any ZAP values that are read without errors may be used for maintaining the writer position over the second virtual track.

In another arrangement, the device may occasionally measure reader-to-writer offset (e.g., using a health check procedure) and determine a change in reader-to-writer offset as indicated by block 803. If one of the ZAP values was initially utilized 802, another of the ZAP values may optionally be used 804 in response to a change in reader-to-writer offset. This selection of the other ZAP value may be active (e.g., selected by the servo controller) or passive (e.g., the reader naturally passes over one of the ZAP values based on a current amount of reader-to-writer offset).

Figure 9:
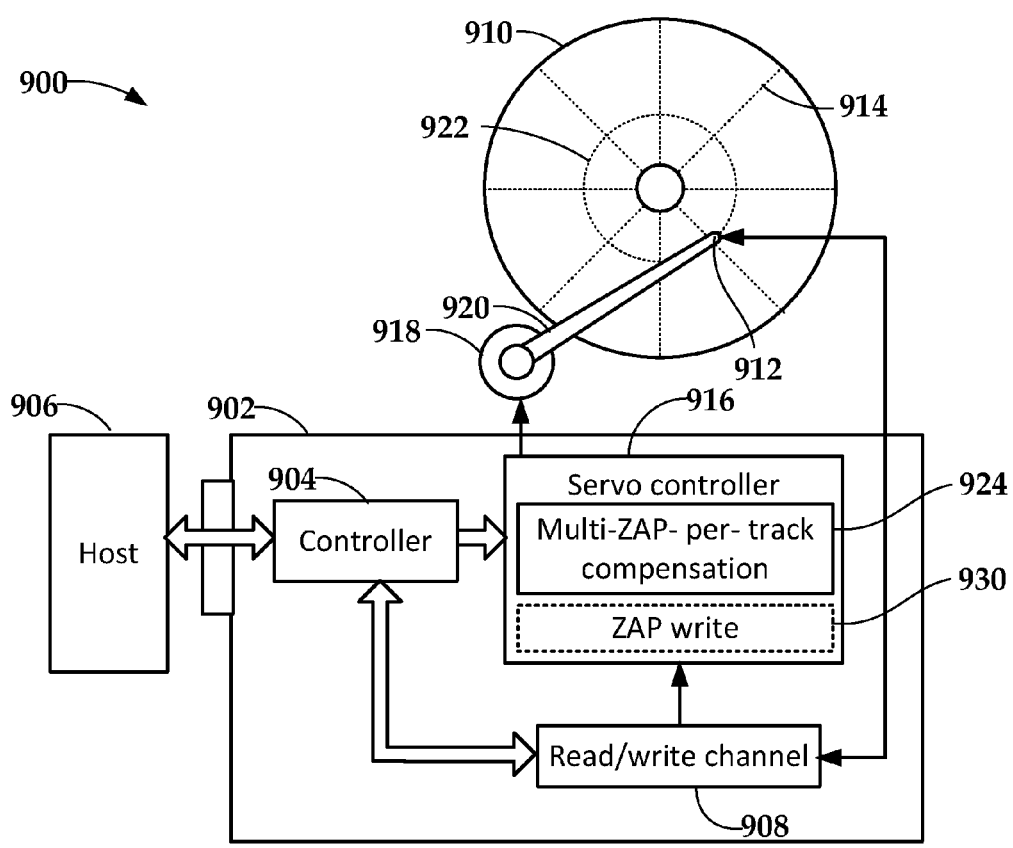
FIG. 9 is a block diagram of an apparatus according to an example embodiment.

In FIG. 9, a block diagram illustrates an apparatus 900 (e.g., hard disk drive, data storage device) that facilitates writing and/or read multiple ZAP values per track according to an example embodiment. The apparatus includes control logic circuitry 902 with one or more controllers 904 that govern operations of the apparatus 900. For example, the controller 904 may process read and write commands and associated data from a host device 906. The host device 906 may include any electronic device that can be communicatively coupled to store and retrieve data from a data storage device, e.g., a computer, peripheral bus card, test stand, etc. The data controller 904 is coupled to a read/write channel 908 that reads from and writes to a surface of a magnetic disk 910.

The read/write channel 908 generally converts data between the digital signals processed by the data controller 904 and the analog signals conducted through one or more read/write heads 912. The read/write channel 908 also provides servo data read from servo marks/wedges 914 on the disk 910 to a servo controller 916. The servo controller 916 uses these signals to drive an actuator 918 (e.g., voice coil motor, or VCM and/or micro-actuator) that rotates an arm 920 upon which the read/write heads 912 are mounted.

Data within the servo wedges 914 can be used to detect the location of a read/write head 912. The servo controller 916 uses servo data to move a read/write head 912 to an addressed track 922 and block on the disk 910 in response to the read/write commands (seek mode). While data is being written to and/or read from the disk 910, the servo data is also used to maintain the read/write head 912 aligned with the track 922 (track following mode).

Although two separate controllers 904 and 916 and a read write channel 908 have been shown for purposes of illustration, it is to be understood that their functionality described herein may be integrated within a common integrated circuit package or distributed among more than one integrated circuit package. Similarly, a head disk assembly can include a plurality of data storage disks 910, an actuator arm 920 with a plurality of read/write heads 912 (or other sensors) which are moved radially across different data storage surfaces of the disk(s) 910 by the actuator motor 918 (e.g., voice coil motor), and a spindle motor (not shown) which rotates the disk(s) 910.

The circuitry 902 may include a multi-ZAP-per-track compensator 924 detects ZAP values that written to the disk 910. The compensator 924 may select from two or more ZAP values associated with the same virtual track. At least one of the selected ZAP values is used to follow a virtual track during read and/or write operations. The selected ZAP value may be either passively or actively selected based on at least a reader-to-writer separation or each of the read/write heads 912, and also possibly based on a skew angle of the read/write heads 912.

An optional ZAP write module 930 is shown that facilitates writing the multiple ZAP values to each virtual track. After the apparatus 900 is assembled, certain operations may be performed to ensure that the read/write heads are operating correctly (e.g., setting clearances, write currents, bias values, etc.). After the heads are operating according to specification, the write module 930 can traverse each physical track on the surfaces of the disk(s) 910, measure RRO for each track, and store correction values on the disk 910. The module 930 may be temporarily stored in memory of the apparatus 900 during qualification testing and then removed before the apparatus 900 leaves the factory.

The embodiments described above may be used with any type of magnetic disk drive. For example, conventional hard disk drives using perpendicular recording may utilize multiple ZAP fields per track as described above, and may be relevant to other developing magnetic disk drive technologies, such as shingled media recording, bit patterned media, etc. These techniques may be used in hybrid devices as well, e.g., devices that combine magnetic media with solid-state, non-volatile memory (e.g., flash memory).

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    writing first and second repeatable runout correction (ZAP) values both located on a first virtual track of a magnetic disk, the first ZAP value offset from a center of the first virtual track in a first direction and the second ZAP value offset from the first virtual track center in a second direction opposite the first direction; and
    utilizing at least one of the first and second ZAP values for repeatable runout correction when positioning a writer of a read/write head over a second virtual track, the first and second virtual tracks being offset from physical tracks that are defined by servo marks written to the magnetic disk during manufacture.

2. The method of claim 1, further comprising utilizing another of the first and second ZAP values during a service life of a drive utilizing the repeatable runout correction, the utilization of the other ZAP value occurring in response to a change in reader-to-writer offset of the read/write head during the service life of the drive.

3. The method of claim 2, wherein the magnetic disk comprises a heat-assisted recording medium, and wherein the change in reader-to-writer offset is caused by thermal degradation of the read/write head.

4. The method of claim 3, wherein the thermal degradation is due to degradation of an optical path used to heat the magnetic disk during recording.

5. The method of claim 1, wherein at least one of the first and second ZAP values is accessed by a reader of the read/write head that is located over the first virtual track during writing, wherein a writer of the read/write head is located over the second virtual track during the writing.

6. The method of claim 1, wherein the first and second ZAP values are written onto the magnetic disk in a factory process that occurs after the magnetic disk has been assembled into a data storage device.

7. An apparatus comprising:
    a read/write channel configured to communicate with a read/write head that reads from and writes to a magnetic disk;
    a controller coupled to the read/write channel and configured to:
        write a first repeatable runout (ZAP) value on a first virtual track of the magnetic disk, the first ZAP value offset from a center of the first virtual track in a first direction;
        write a second ZAP value on the first virtual track, the second ZAP value offset from the first virtual track center in a second direction opposite the first direction; and
        utilize at least one of the first and second ZAP values when performing repeatable runout correction for a writer of the read/write head that is being positioned over a second virtual track of the magnetic disk, the first and second virtual tracks being offset from physical tracks defined by servo marks that are written to the magnetic disk during manufacture.

8. The apparatus of claim 7, wherein the controller is further configured to utilize another of the first and second ZAP values for the repeatable runout correction during a service life of the apparatus, the utilization of the other of the first and second ZAP values occurring in response to a change in reader-to-writer offset of the read/write head during the service life of the apparatus.

9. The apparatus of claim 8, wherein the magnetic disk comprises a heat-assisted recording medium, and wherein the change in reader-to-writer offset is caused by thermal degradation of the read/write head.

10. The apparatus of claim 9, wherein the thermal degradation is due to degradation of an optical path used to heat the magnetic disk during recording.

11. The apparatus of claim 7, wherein at least one of the ZAP values is accessed by a reader of the read/write head that is located over the first virtual track during writing, wherein a writer of the read/write head is located over the second virtual track during the writing.

12. The apparatus of claim 7, wherein the first and second ZAP values are written onto the magnetic disk in a factory process that occurs after the magnetic disk has been assembled into a data storage device.

13. The apparatus of claim 7, wherein the magnetic disk is divided into two or more radial zones, and the first and second virtual tracks being located in a first of the two or more zones, wherein another of the two or more zones utilizes more or fewer than two ZAP fields per virtual track.

14. An apparatus comprising
a magnetic disk comprising a first virtual track with first and second repeatable runout correction (ZAP) values stored on the magnetic disk along the first virtual track, the first ZAP value offset from a center of the first virtual in a first direction and the second ZAP value offset from the first virtual track center in a second direction opposite the first direction;
a read/write head that reads from and writes to the magnetic disk;
a controller coupled to the read/write head and configured to utilize at least one of the first and second ZAP values when performing repeatable runout correction for a writer of the read/write head that is being positioned over a second virtual track of the magnetic disk, the first and second virtual tracks being offset from physical tracks defined by servo marks that are written to the magnetic disk during manufacture.

15. The apparatus of claim 14, wherein the controller is further configured to utilize another of the first and second ZAP values for the repeatable runout correction during a service life of the apparatus, the utilization of the other of the first and second ZAP values occurring in response to a change in reader-to-writer offset of the read/write head during the service life of the drive.

16. The apparatus of claim 15, wherein the magnetic disk comprises a heat-assisted recording medium, and wherein the change in reader-to-writer offset is caused by thermal degradation of the read/write head.

17. The apparatus of claim 16, wherein the thermal degradation is due to degradation of an optical path used to heat the magnetic disk during recording.

18. The apparatus of claim 14, wherein at least one of the ZAP values is accessed by a reader of the read/write head that is located over the virtual track during writing, wherein a writer of the read/write head is located over a different virtual track during the writing.

19. The apparatus of claim 14, wherein the first and second ZAP values are written onto the magnetic disk in a factory process that occurs after the magnetic disk has been assembled into a data storage device.

20. The apparatus of claim 14, wherein the magnetic disk is divided into two or more radial zones, and the first and second virtual tracks being located in a first of the two or more zones, wherein another of the two or more zones utilizes more or fewer than two ZAP fields per virtual track.

* * * * *